Sept. 17, 1940.   E. H. SMITH   2,215,019
PROCESS OF MAKING TORCH TIPS
Filed July 3, 1939

INVENTOR
ELMER H. SMITH
By Paul, Paul Moore Gierl
ATTORNEYS

Patented Sept. 17, 1940

2,215,019

UNITED STATES PATENT OFFICE 2,215,019

PROCESS OF MAKING TORCH TIPS

Elmer H. Smith, Minneapolis, Minn., assignor to Smith Welding Equipment Corporation, Minneapolis, Minn., a corporation of Minnesota Application July 3, 1939, Serial No. 282,751

4 Claims. (Cl. 29—157)

This invention relates to new and useful improvements in the manufacture of torch tips of the general character disclosed in my co-pending application, Serial Number 282,750, filed July 3, 1939.

The torch tip disclosed in the aforementioned application is made from two parts, an outer tubular blank and an inner core of ductile metal, having wire elements inserted therebetween, after which they are subjected to a series of swaging operations to complete the formation of the torch tip body.

The torch tip herein disclosed differs from the above mentioned tip, in that it is constructed from a single piece of metal which, after being subjected to a series of swaging operations, while the blank is supported on suitable mandrels and wire elements, is finally reduced to a given size, after which the wire elements and mandrel are removed from the blank, whereby a plurality of longitudinally extending passages are provided in the torch tip body.

An object of the invention therefore, is to provide a simple process of forming a torch tip from a single piece of ductile metal.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 3:
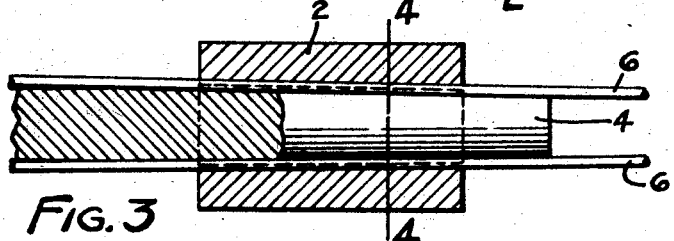
Figure 3 is a longitudinal sectional view showing the blank after the first swaging operation.
Figure 2:
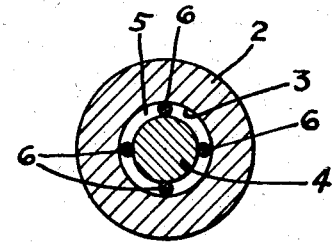
Figure 2 is a cross-sectional view on the line 2—2 of Figure 1.
Figure 5:
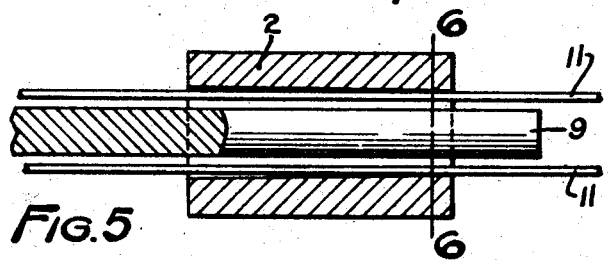
Figure 5 is a view similar to Figure 3, showing the blank positioned on a mandrel of smaller diameter than the one shown in Figure 3, with smaller wire elements positioned in the grooves formed by the wire elements in the first swaging operation.

The novel and simple process herein disclosed, is carried out in the following manner: The blank, generally designated by the numeral 2, and from which the body of the torch tip is to be formed, is shown provided with a bore 3 adapted to receive a mandrel 4, preferably of hardened steel. The diameter of the mandrel 4 is relatively smaller than the bore 3 of the blank, whereby an annular gap 5 is provided between the wall of the bore 3 and the periphery of the mandrel 4. To form the longitudinally extending passages through the torch tip body, a plurality of wire elements 6 are interposed in the gap 5, as shown in Figures 2 and 3. These wire elements are preferably spaced equi-distant apart, and may be supported accurately by suitable supporting collars 7 and 8, placed at opposite ends of the blank 2 in axial alinement therewith.

Figure 1:
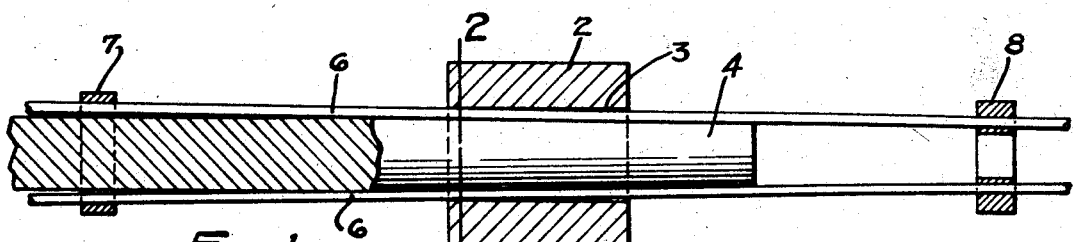
Figure 1 is a view showing the tubular blank supported on a mandrel with wire elements interposed between the wall of the bore of the blank and the periphery of the mandrel.

After the wire elements have thus been positioned between the blank 2 and the mandrel 4, as shown in Figures 1 and 2, the blank is subjected to a swaging operation, whereby its diameter is reduced and its overall length elongated. Such reduction in diameter of the blank by the swaging dies, causes the bore 3 to reduce in diameter, whereby the wire elements 6 become embedded in the wall thereof, as shown in Figure 4, it being understood that the mandrel 4 is preferably of hardened steel, whereby the wire elements cannot become embedded in the periphery thereof.

Figures 4, 6:
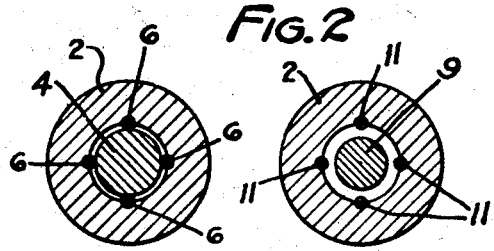
Figure 4 is a cross-sectional view on the line 4—4 of Figure 3, showing the wire elements partially embedded in the wall of the bore of the blank.
Figure 6 is a cross-sectional view on the line 6—6 of Figure 5.

When the blank 2 has been swaged to substantially the diameter shown in Figure 4, and the wire elements embedded in the wall of the bore thereof, as shown in this figure, the blank is removed from the mandrel 4 and placed on a relatively smaller mandrel 9, and relatively smaller wire elements 11 substituted for the wires 6, whereby the wire elements 11 will be spaced outwardly from the periphery of the mandrel 9, as shown in Figure 6.

In the drawing, I have shown the wire elements progressively reduced in size for each swaging operation, whereby the partially completed passages or "grooves," provided in the wall of the bore of the blank, gradually diminish in size, as the process of forming the tip proceeds, as will readily be understood.

Figure 7:
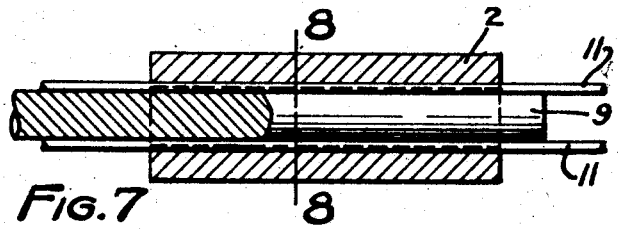
Figure 7 is a view showing the blank after the second swaging operation.
Figures 8, 11:
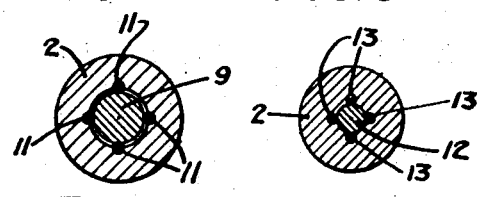
Figure 8 is a cross-sectional view on the line 8—8 of Figure 7.
Figure 11 is a cross-sectional view on the line 11—11 of Figure 10, showing the wire elements substantially embedded in the wall of the bore of the blank.
Figure 10:
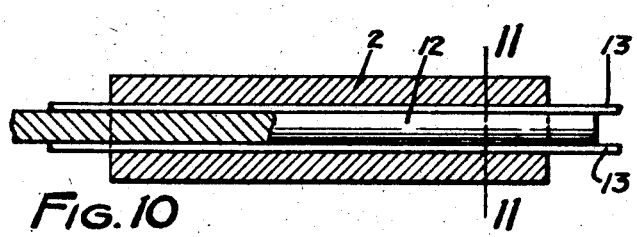
Figure 10 is a view showing the blank positioned on the mandrel of Figure 9, after the swaging operation.

In the next step, the blank is subjected to another swaging operation until the blank is reduced to the diameter shown in Figures 7 and 8, wherein it will be noted that the bore of the blank is so reduced in diameter that the wire elements 11 are brought into peripheral contact with the smaller mandrel 9, thereby causing the wire elements to become further embedded in the metal of the blank, as clearly illustrated in Figures 7 and 8.

Figures 9, 12:
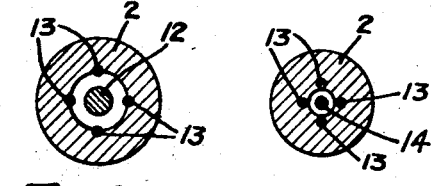
Figure 9 is a cross-sectional view showing the partially swaged blank positioned on a still smaller mandrel.
Figure 12 is a view showing a small wire substituted for the mandrel shown in Figure 10.
Figure 13:
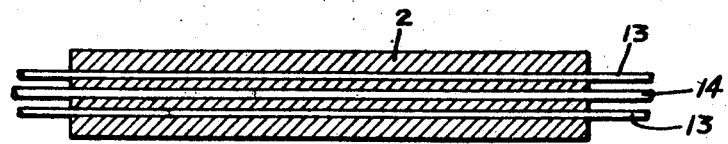
Figure 13 is a longitudinal sectional view of Figure 12, after the next swaging operation, showing all of the wire elements completely embedded in the metal of the blank.
Figure 15:
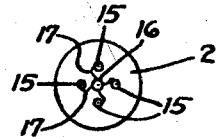
Figure 15 is an end view of Figure 14.

In Figure 9, it will be noted that a still smaller mandrel 12 has been substituted for the mandrel 9, shown in Figures 7 and 8, and smaller wire elements 13 have also been substituted for the wire elements 11 of Figures 7 and 8. The blank is then subjected to another swaging operation, whereby its bore is reduced to substantially the diameter of the mandrel 12, as shown in Figure 11, after which the mandrel 12 and wire elements 13 are removed from the blank.

In the final operation, a comparatively small mandrel or wire 14 is substituted for the mandrel 12, and the blank is then again swaged until its bore is reduced to the diameter of the wire element or mandrel 14. The wire elements 13 and mandrel or wire element 14 are then removed from the blank, whereby a plurality of longitudinally extending passages 15 and 16 are provided, which extend lengthwise through the partially completed torch tip body, as clearly illustrated in Figure 14.

Figure 14:
Figure 14 is a view showing the blank of Figure 13, after the wire elements have been removed therefrom.

When the torch tip body has been completed, as shown in Figure 14, a plurality of small hairlike lines 17 may be observed, when looking at the ends of the tip body. These hair lines indicate the metal-to-metal contact of the metal of the blank forced around the wire elements by the swaging operations. The swaging operations so thoroughly compact or force the metal of the blank around the wire elements, that the joints between the passages or orifices 15 and 16 are substantially hermetically sealed, whereby gases conducted through the passages in the torch tip body cannot leak from one passage to another.

In the process, as above described, the wire elements used to form the passages 15 through the torch tip body, have been reduced in diameter for each step, whereby the passages or "grooves," as they actually are, in the first two or three operations, will gradually be reduced in size, until the blank is swaged on the smaller mandrel 14. When the blank is swaged, while supported on the mandrel 14, the bore of the blank is reduced to the diameter of the mandrel 14, whereby the wire elements 13 may become substantially completely embedded in the metal of the blank, as illustrated in Figure 14.

It is to be understood, however, that the process may be carried out by using the same size wires for each swaging operation. The number of mandrels and swaging operations may also be varied without departing from the scope of the invention.

The torch tip body, as shown in Figure 14, comprises a plurality of longitudinally extending passages 15, which are accurately spaced with respect to one another, and are of uniform diameter. The passages 15 surround the central passage 16, and are preferably spaced equi-distant apart around the central passage 16. The number of passages 15 may be varied, as desired, without departing from the scope of the invention.

In the present application, I have shown the grooves originally produced in the wall of the bore of the blank 2 as being formed by the wire elements seated against the mandrel 4. It is to be understood that in some instances, it may be found more desirable to initially form a plurality of grooves in the wall of said bore by placing the blank on a longitudinally ribbed mandrel, such as disclosed in my co-pending application, hereinbefore mentioned, after which wire elements may subsequently be used to complete the formation of the longitudinal passages 15 and 16, shown in Figure 14, and as herein disclosed.

I claim as my invention:

1. A process of forming a torch tip from a single blank of ductile metal having a bore therein, which consists in placing the blank on a mandrel, the diameter of which is smaller than the bore in the blank whereby an annular gap is provided between the wall of said bore and the periphery of the mandrel, placing a plurality of wire elements in said gap, then swaging the blank to reduce the bore thereof, whereby the wire elements become embedded in the wall of said bore, removing the blank from said mandrel and placing it on a relatively smaller mandrel, and again swaging the blank until the wire elements become completely embedded in the metal of the blank, and finally removing the wire elements and mandrel from the blank, whereby a plurality of longitudinally extending passages are provided in the blank.

2. A process of forming a torch tip from a single piece of ductile metal in the form of a tubular blank, which consists in placing the blank on a mandrel, the diameter of which is smaller than the bore of the blank whereby an annular gap is provided between the wall of said bore and the periphery of the mandrel, placing a plurality of wire elements in said gap and supporting them in spaced relation around the mandrel, then swaging the blank to reduce the bore thereof, whereby the wire elements become partially embedded in the wall of said bore, removing the blank from said mandrel and placing it on a relatively smaller mandrel, and repeating the swaging operation, using a smaller mandrel for each swaging operation, until the wire elements become completely embedded in the metal of the blank and the bore in the blank is reduced to provide a central passage in the torch tip, when the blank is removed from the mandrel, and finally removing the wire elements from the blank, whereby a plurality of longitudinally extending passages are provided in the blank which surround said central passage.

3. A process of forming a torch tip from a single blank of ductile metal having a bore therein, which consists in placing the blank on a hardened steel mandrel, the diameter of which is smaller than the bore of the blank, whereby an annular passage is provided between the bore of the blank and the periphery of the mandrel, placing a plurality of wire elements in said gap in spaced relation, then swaging the blank to reduce its diameter and bore, whereby the wire elements become partially embedded in the wall of said bore, removing the blank from said mandrel and the wire elements from the blank, then placing the blank on a relatively smaller mandrel and inserting smaller wires in the grooves formed in the bore of the blank by the wires used in the first swaging operation, and again swaging the blank to further reduce its bore to the diameter of the second mandrel, whereby the wire elements become further embedded in the metal of the blank, and finally replacing the wire elements and blank of the second operation by a plurality of smaller wires and a relatively smaller mandrel, the diameter of which corresponds to the central passage to be provided in the torch tip, when completed, and again swaging the blank until its bore is reduced to the diameter of the last used mandrel, and whereby the wire elements become completely embedded in the metal of the blank and finally removing the mandrel and wire elements from the blank, whereby a plurality of longitudinally extending passages are provided through the tip body, the repeated swaging operations sealing the joints between said passages to prevent leakage therebetween.

4. A process of forming a torch tip from a single blank of ductile metal having a bore therein, the wall of which has previously been longitudinally grooved, which consists in placing the grooved blank on a mandrel and inserting a wire element through each groove, then swaging the blank to reduce its bore to substantially the diameter of the mandrel, removing the blank from said mandrel and placing it on a relatively smaller mandrel, and again swaging the blank until the wire elements become completely embedded in the metal of the blank, and finally removing the wire elements and mandrel from the blank, whereby a plurality of longitudinally extending passages are provided in the blank.

ELMER H. SMITH.